(12) United States Patent
Hayek et al.

(10) Patent No.: US 6,224,254 B1
(45) Date of Patent: May 1, 2001

(54) RADIO TELEPHONE TIMEPIECE INCLUDING A SIM CARD

(75) Inventors: Nicolas Georges Hayek, Meisterschwanden; Wilhelm Salathé, Evilard; Rudolf Dinger, Saint-Aubin; Jean-Jacques Born, Morges; Dominique Dubugnon, Etoy, all of (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 09/466,843

(22) Filed: Dec. 20, 1999

(30) Foreign Application Priority Data

Dec. 23, 1998 (CH) .................................................. 2554/98

(51) Int. Cl.⁷ ............................ G04B 47/00; G04B 45/00
(52) U.S. Cl. ............................................. 368/281; 368/10
(58) Field of Search .............................. 368/10, 281, 282

(56) References Cited

U.S. PATENT DOCUMENTS

| | | | |
|---|---|---|---|
| 5,144,599 | * 9/1992 | Blaich et al. | 368/10 |
| 5,625,606 | 4/1997 | Openiano | 368/10 |
| 5,802,014 | * 9/1998 | Danko | 368/10 |

FOREIGN PATENT DOCUMENTS

| | | |
|---|---|---|
| 298 01 806 U1 | 4/1998 | (DE). |
| 298 09 862 U1 | 11/1998 | (DE). |
| WO 90/13068 | 11/1990 | (WO). |

* cited by examiner

Primary Examiner—Bernard Roskoski
(74) Attorney, Agent, or Firm—Griffin & Szipl, P.C.

(57) ABSTRACT

The present invention relates to a radio telephone watch (1) intended to be used in a mobile communication system, said watch (1) including a case (2) and a wristband (3) allowing said watch (1) to be worn on the wrist. According to the present invention, this watch further includes a casing (4; 8; 104), associated with a first strand (31) of said wristband (3), capable of receiving, in a removable manner, a SIM card (10) allowing access to said mobile communication system, an electronic module (5) arranged in said watch case (2) and allowing access to data stored in said SIM card (10), and electric connection means (6) between said SIM card (10) and said electronic module (5), integrated in said first strand (31) of the wristband (3).

According to the present invention, a device (7; 9) assuring the fastening of said wristband (3) is further advantageously associated with said casing (4; 8; 104).

11 Claims, 7 Drawing Sheets

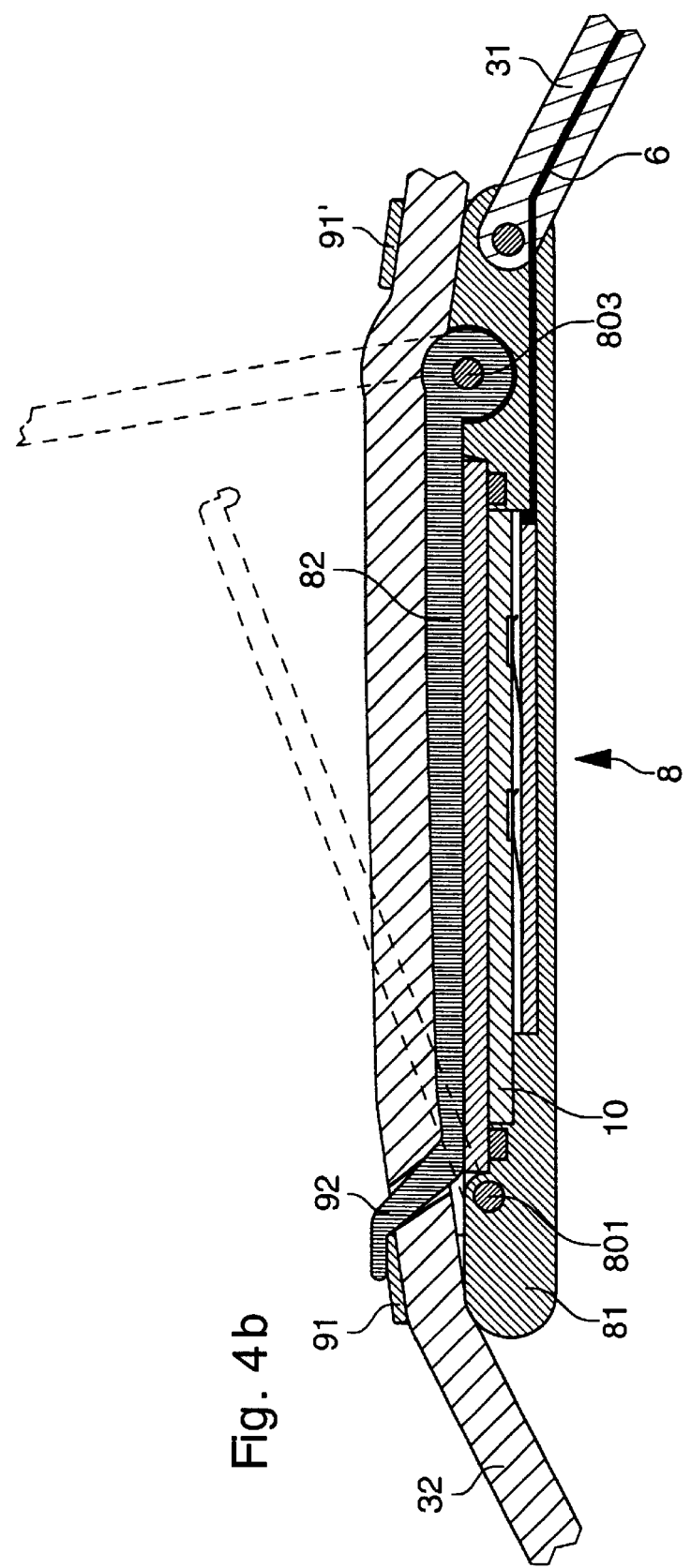

RADIO TELEPHONE TIMEPIECE INCLUDING A SIM CARD

The present invention relates to a radio telephone watch intended to be worn on a user's wrist. More precisely, the present invention relates to such a radio telephone watch intended to be used in a mobile communication system, such as for example, the GSM network (Global System for Mobile communications), this watch being capable of receiving, in a removable manner, a SIM card (Subscriber Identity Module) allowing access to said mobile communication system.

Communication devices, such as cellular telephones, intended to be used in a mobile communication system, such as, for example, the GSM network, commonly require the use of smartcards physically connected to the communication device. These smartcards are intended to assure both the identification of the users by an operator of the communication system, and the compatibility and interchangeability of the communication devices at the heart of this communication system.

These smartcards allow the user to have access to the mobile communication system via a provider or operator of the appropriate network. They thus contain data defining the access procedure to the mobile communication system and further allow storage of complementary data relating to the user, such as a personal identification number and/or a list of telephone numbers.

The dimensions and physical features of these smartcards are defined by international standards, in particular standards ISO/IEC 7810, 7816/1 and 7816/2. A smartcard of this type thus takes the form of a plastic card on which are arranged a printed circuit and an electronic chip. Essentially there exist two standard formats for smartcards intended for mobile communication devices. The first format is similar to that of a credit card (85.60×53.98×0.80 mm). The second format has dimensions of less than the order of 25.00× 15.00×0.80 mm one example of which is illustrated in FIG. 1 and to which we will return later. These card formats are moreover commonly designated SIM cards. Such SIM cards are currently used in mobile communication devices.

In parallel, recent technological developments in the telephony field have allowed the dimensions of communication devices to be greatly reduced, thus allowing them to be integrated into portable devices of small size, such as watches. Such devices, which will be designated radio telephone watches in the description hereinafter, have been developed, first, to operate as cordless or <<microcellular>> telephones, i.e. small range telephones requiring a base station and using communication protocols such as standards CT-1, CT-2 or DECT. These cordless or <<microcellular>> telephones do not require a SIM card.

However, in order to make a cellular type of radio telephone watch, i.e. a radio telephone watch capable of operating in a global communication system, the watch must necessarily include a SIM card.

This SIM card constitutes an element which any user must be able to remove or replace easily. It is thus crucial to arranged the card in the mobile communication device in such a way that the user can easily have access thereto.

In mobile telephone devices such as cellular telephones, these SIM cards are generally arranged inside the case, for example under a module including a rechargeable battery which the user can easily remove.

Conversely, in the case of a radio telephone watch, it is preferable not to arrange the SIM card inside the watch case. It is in fact preferable typically only to authorise access to the interior of the case to enable a specialist to perform maintenance or limited reparations. However, it is sought to facilitate as much as possible the access and interchangeabililty of the SIM card.

One object of the present invention is thus to propose a radio telephone watch intended to be used in a mobile communication system, and capable of receiving a SIM card the accessibility and interchangeability of which is facilitated so that a user can remove or replace it quickly and easily.

The present invention thus concerns a radio telephone watch intended to be used in a mobile communication system, this watch including in particular a case and a wristband allowing said watch to be worn on the wrist, characterised in that the watch includes in particular:

a casing, associated with a first strand of said wristband, capable of receiving, in a removable manner, a SIM card (Subscriber Identity Module) allowing access to said mobile communication system;

an electronic module arranged in said watch case and allowing access to data stored in said SIM card; and electric connection means between said SIM card and said electronic module, integrated in said first wristband strand.

The solution recommended by the present invention thus avoids incorporating the SIM card inside the watch case to which access is generally complex since it requires operations which it is desirable should only be performed by a watchmaking specialist. The removal and replacement of the SIM card are thus made easier and can be effected quickly by a non specialised user.

Consequently, the replacement or removal of the SIM card in a watch according to the present invention does not lead, via the arrangement thereof in the wristband of the watch, to deterioration in the features of the watch case, in particular the sealing thereof. The incorporation of the SIM card in the watch wristband allows any liquid infiltration, which could damage the watch, to be contained.

The casing of the radio telephone watch according to the present invention can advantageously be associated with the first wristband strand so as to be situated in a substantially plane zone of the wrist so that the user is not handicapped by the positioning of the casing.

The casing of the radio telephone watch according to the present invention can further be made water-resistant if so desired.

According to an embodiment of the present invention, the casing can further advantageously be associated with a device assuring the fastening of the wristband. This casing can also advantageously be associated with the device assuring the fastening of the wristband so as to co-operate therewith, in particular to avoid any inadvertent opening of the casing including the SIM card.

According to another embodiment of the present invention, a supply source for the radio telephone watch can further be advantageously arranged in the casing able to receive the SIM card.

Other features and advantages of the present invention will appear upon reading the following description made with reference to the annexed drawings, given solely by way of non limiting example, and in which:

FIGS. 3a to 3c show detailed views of a first embodiment of the present invention in which FIGS. 3a and 3c are plane views of said embodiment, and FIG. 3b is a cross-section along the line IIIb;

FIGS. 4a and 4b show detailed views of another embodiment of the present invention, in which FIG. 4a is a plane view of said other embodiment and FIG. 4b is a cross-section along the line IVb.

Figure 1:
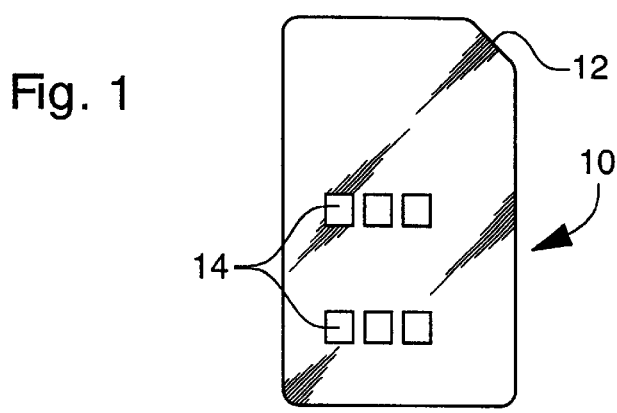
FIG. 1 shows a standard SIM card used in the radio telephone watch according to the present invention.

With reference first to FIG. 1, the main features of the SIM card 10 used in the watch according to the present invention will briefly be presented.

This SIM card 10 takes the form of a flat essentially rectangular element having dimension of the order of 15 mm×25 mm. This SIM card 10 includes in particular an oblique edge 12 allowing the orientation thereof to be defined.

A plurality of terminals 14, six in number, are formed on one surface of SIM card 10 and are internally connected to the electronic chip (not shown) containing in particular data defining the access procedure to the mobile communication system. In the illustration of FIG. 1, it will be noted that SIM card 10 is oriented with its terminals 14 directed upwards.

Figure 2A:
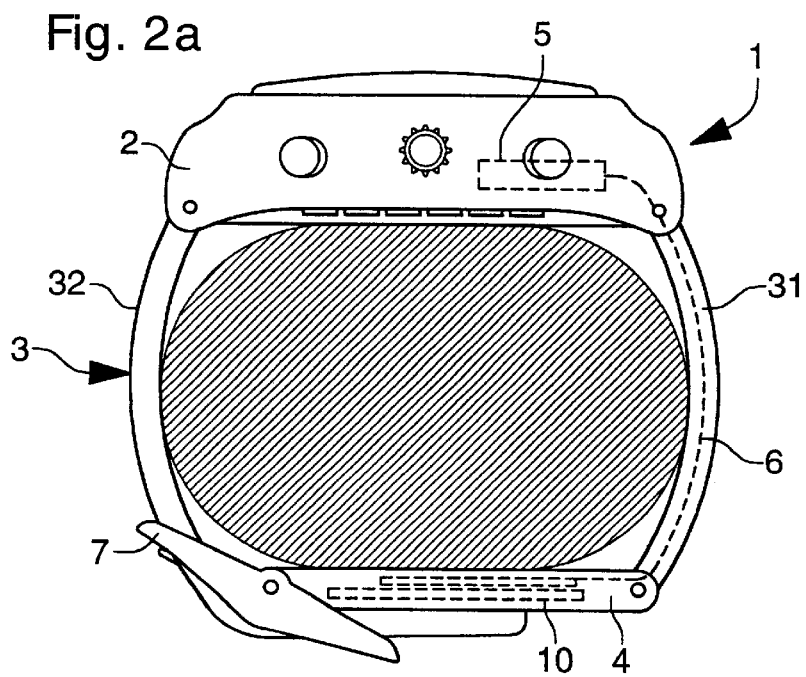
FIGS. 2a and 2b are respectively side and front views of a radio telephone watch according to the invention including in particular a case, a wristband, a casing able to receive a SIM card, an electronic module arranged in the case and allowing access to the data stored in the SIM card, and electric connection means between the SIM card and the electronic module.
Figure 2B:
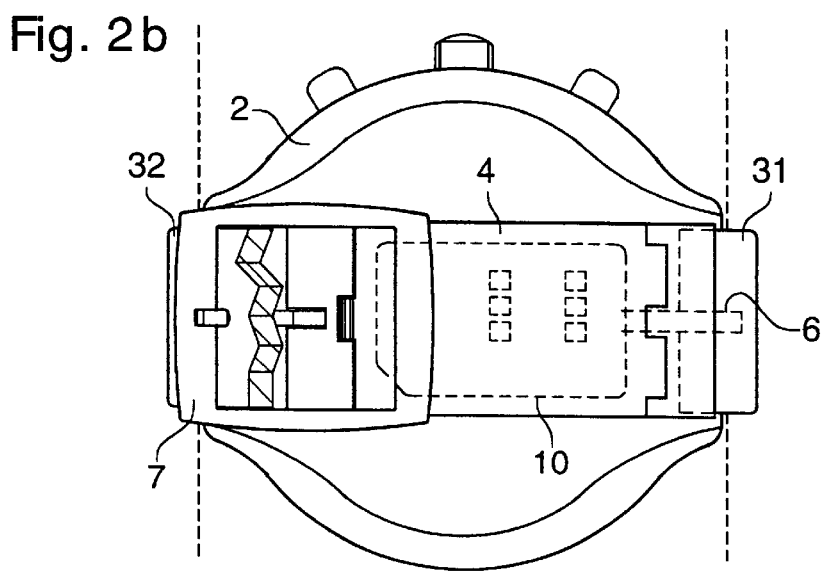

FIGS. 2a and 2b show respectively side and front views of a radio telephone watch according to the present invention which is able to receive a SIM card of the type described with reference to FIG. 1.

This watch 1 includes on the one hand, a case 2 and a wristband 3 including first and second strands 31 and 32 respectively attached to the ends of case 2 of watch 1. According to the present invention, the watch further includes, associated with wristband 3, a casing 4 able to receive SIM card 10 (illustrated in dot and dash lines in FIGS. 2a and 2b).

Casing 4 is advantageously associated with wristband 3 so as to be situated in a substantially plane zone of the wrist. Preferably, as is illustrated in FIGS. 2a and 2b, casing 4 is arranged at the end of first strand 31 of wristband 3 and is thus arranged so as to be situated on the back side of the user's wrist when the latter wears watch 1, i.e. on the side opposite the face on which case 2 of watch 1 rests.

An electronic module 5 allowing access to the data stored in SIM card 10 is further arranged inside case 2 of watch 1. This electronic module 5 allows, in particular, the data relating to the access to the mobile communication system to be consulted and/or complementary data to be stored or read, such as telephone numbers or a personal identification number.

Moreover, in order to electrically connect SIM card 10 to electronic module 5 which is arranged inside case 2, watch 1 according to the present invention further includes electric connection means 6 mainly integrated in a strand of wristband 3, in this example, in first wristband strand 31. These electric connection means 6 are shown schematically in dot and dash lines in FIGS. 2a and 2b.

Electric connection means 6 can advantageously be made in the form of conductive paths deposited on a flexible dielectric substrate, for example by a photolithography. Alternatively, electric connection means 6 can also be made in the form of a set of distinct conductive wires.

In the present description, the way in which electric connection means 6 are connected to the watch case will not be described in detail. It will be mentioned that electric connection devices between a case and conductors placed in a wristband are known to those skilled in the art. One example of such a device is for example disclosed in European Patent No. 0 186 804. Those skilled in the art will thus know how to make an electric connection between the watch case and electric connection means 6 in the appropriate manner.

Radio telephone watch 1 further includes a device 7 assuring the fastening of wristband 3 around the user's wrist. In FIGS. 2a and 2b, this device 7 is for example made, in a non limiting manner, in the form of a clasp including a buckle with a tongue through which the second strand 32 of wristband 3 passes.

It will easily be understood that other wristband fastening devices known to those skilled in the art can be used. Wristband fastening device 7 can, for example, alternatively be made in the form of a loop allowing the passage of second wristband strand 32, the latter being then folded back on itself so that first and second adhesive portions of strand 32 collaborate with each other to assure the fastening of wristband 3.

In an advantageous manner, as will be seen hereinafter by means of various embodiments of the present invention, device 7 assuring the fastening of wristband 3 can be directly associated with casing 4.

Fastening device 7 can further advantageously be associated with casing 4 so as to co-operate therewith, in particular in order to assure that SIM card 10 is held adequately in casing 4.

By means of FIGS. 3a to 3c, an embodiment of the present invention will now be described in more detail.

In these Figures, casing 4 includes a body 41 in which SIM card 10 can be housed, and a movable element 42 assuring the closing of casing 4. Body 41 and movable element 42 collaborate so as to assure the SIM card 10 is adequately held when the latter is inserted in body 41.

In this example, movable element 42 is formed of a cover and is thus rotatably mounted by one of its ends by means of a pin 401 attached to body 41. The fastening of movable element 42 onto body 41 is assured, in a non limiting manner, by a conventional snap fitting system 4A. Other systems allowing the fastening of movable element 42 on body 41 to be assured may easily be envisaged. Thus, movable element 42 may, for example, alternatively be made in the form of a sliding element arranged so as to slide in a groove made in body 41.

Body 41 is connected to first wristband strand 31 via an attachment system 4B of the conventional type including, in particular, an attachment pin 402. In the vicinity of attachment system 4B, body 41 thus preferably has a recess 431 the shape of which substantially limits any rotation of the attached end of first wristband strand 31. This is desirable because of the presence of electric connection means 6 integrated in first wristband strand 31 which penetrate body 41 in the vicinity of attachment 4B. It is indeed desirable to limit the rotation of first wristband strand 31 in the vicinity of attachment 4B in order to avoid any breakage by shearing electric connection means 6.

Body 41 essentially includes a first housing 411 intended to receive SIM card 10 and has similar dimensions to the latter. This first housing 411 includes in particular an oblique edge 412 intended to co-operate with oblique edge 12 of SIM card 10 so as to assure that the orientation of the card in this first housing 411 is such that the latter, and in particular its terminals 14, face a second housing 414 arranged in body 41.

Body 41 further includes a through orifice 415 one end of which opens out in the vicinity of attachment 4B of first wristband strand 31 and the other end of which opens out into second housing 414, so as to allow the passage of electric connection means 6 which are integrated in first wristband strand 31.

Electric connection means 6 include, in this example, six conductive paths 61 formed by deposition of a conductive material on a flexible dielectric substrate 63. These conductive paths 61 are connected, via a connector 45 to a printed circuit 43 arranged in second housing 414 of body 41. This printed circuit 43 carries contact strips 44, six in number, intended to collaborate with terminals 14 of SIM card 10.

It will be noted that this embodiment is in no way limiting. It is, in fact, alternatively possible to form, also by photolithography, contact zones, respectively connected to the conductive paths, directly on an extension of dielectric substrate 63 which, in this case, is arranged on the bottom of second housing 414, and to assure an electric contact between these contact zones and terminals 14 of SIM card 10 via contact strips borne, for example, by an intermediate element arranged in second housing 414 in place of printed circuit 43.

In order preferably to assure sealing of casing 4, a sealing gasket 46 is arranged between body 41 and movable element 42. This sealing gasket 46 is arranged in a channel 47 surrounding first housing 411 of body 41.

Figure 3A:
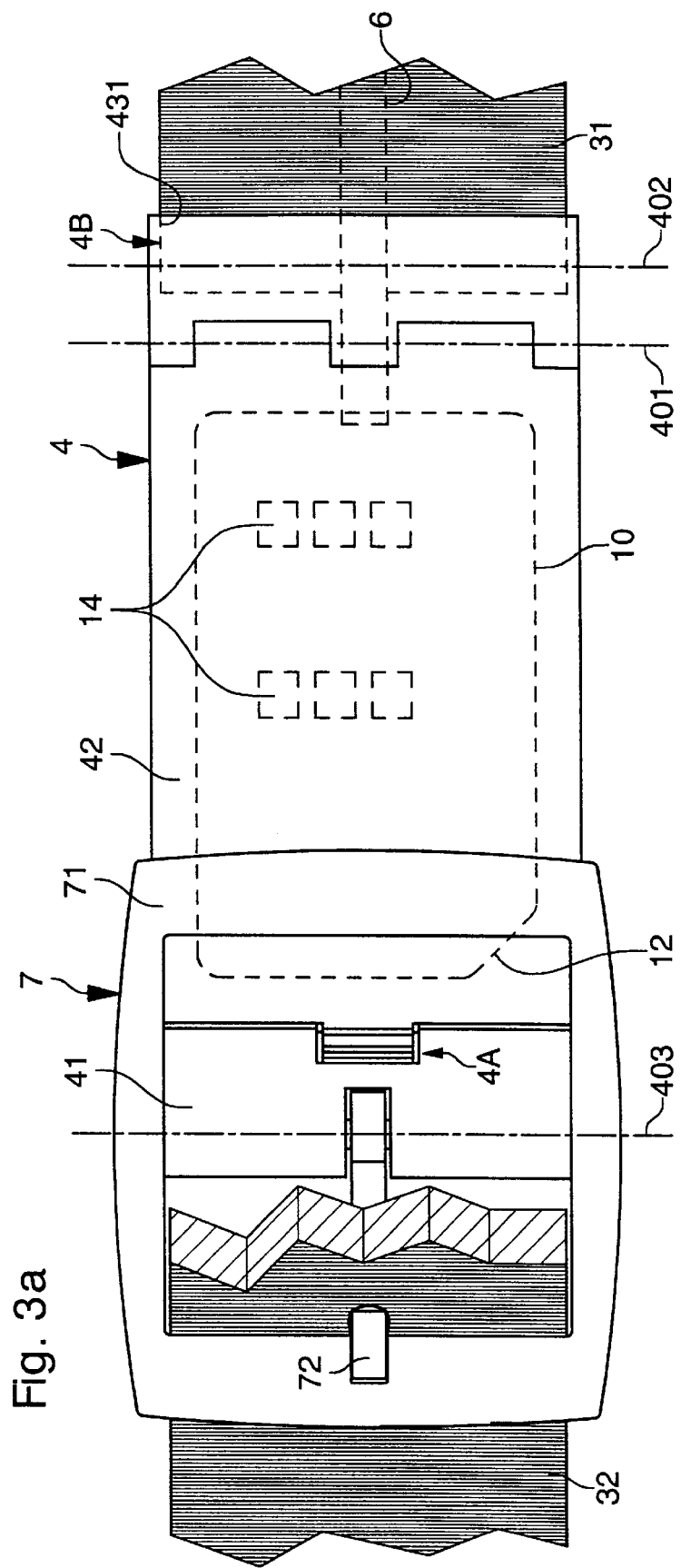
Figure 3B:
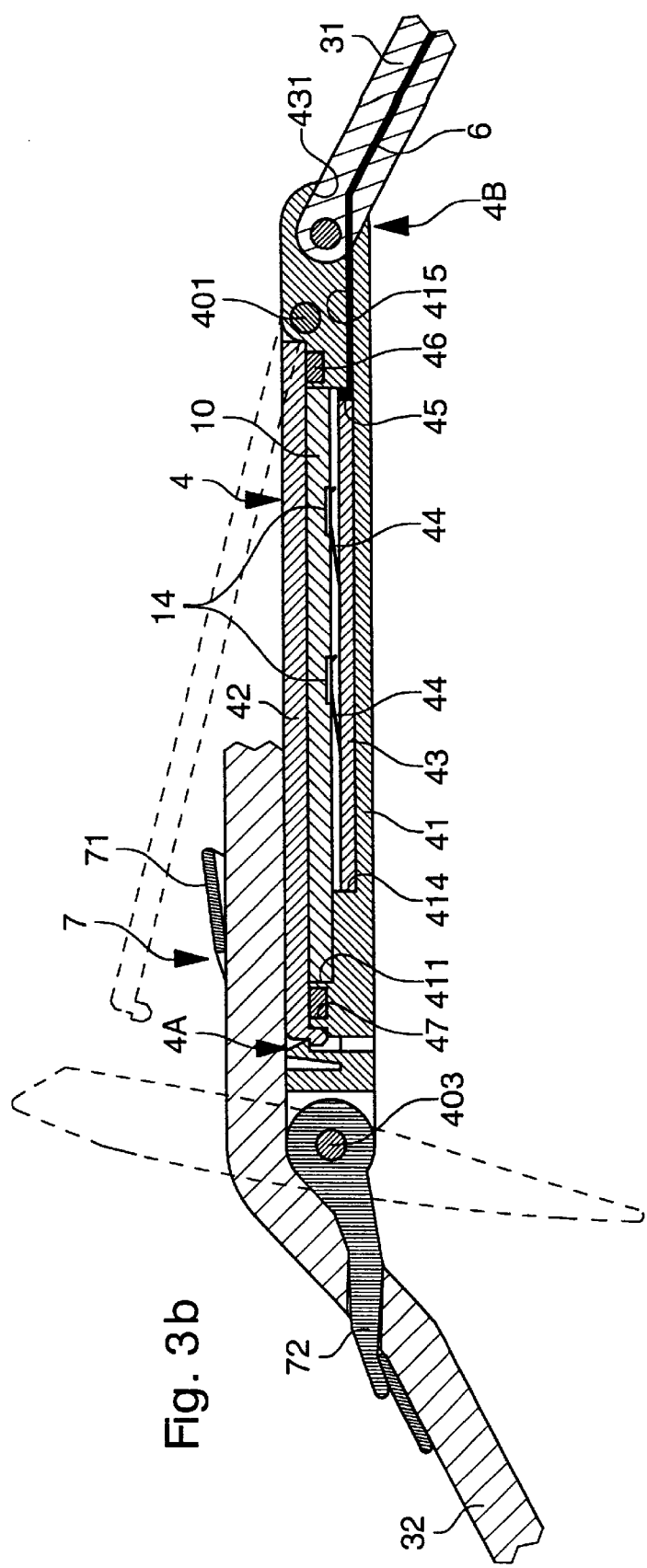
Figure 3C:
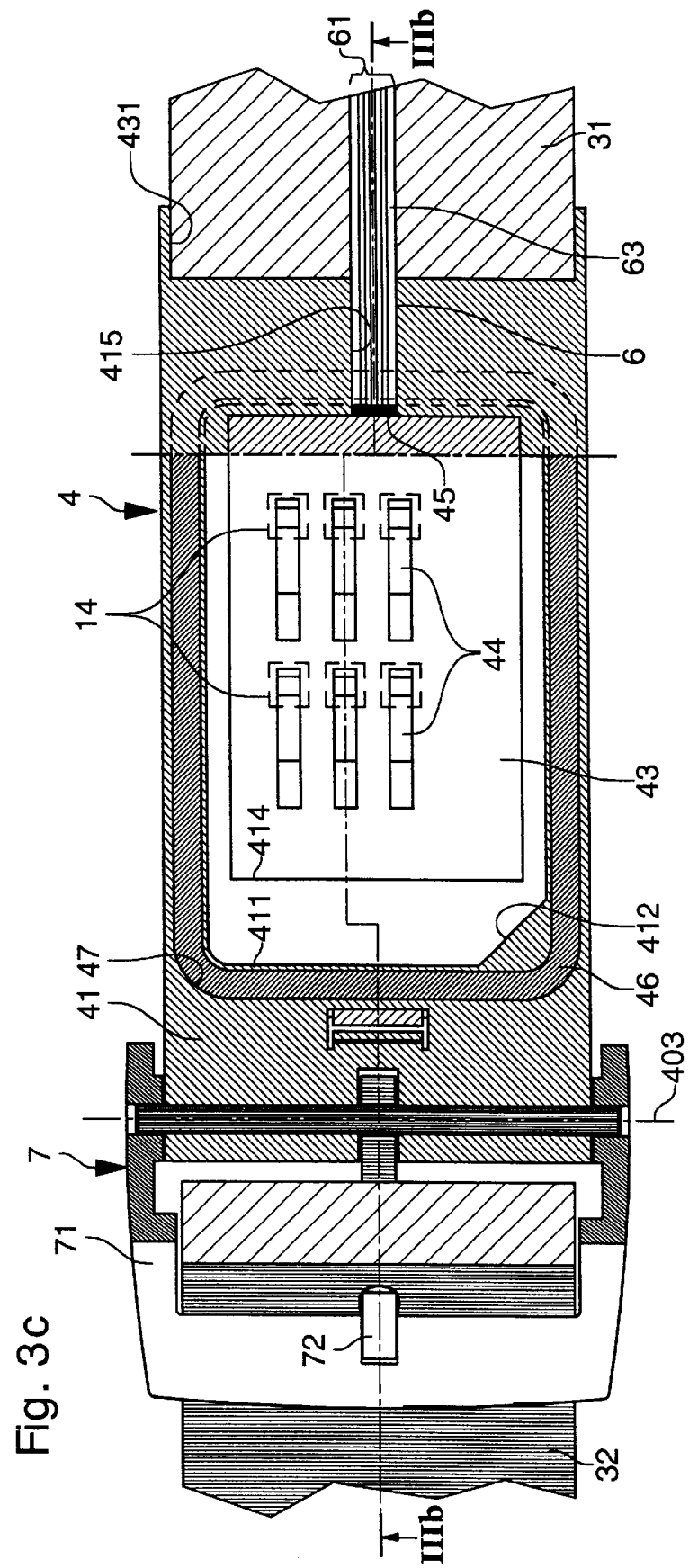

Moreover, the sealing of casing 4 in the vicinity of through orifice 415 can be assured directly by the contact existing between the end of first wristband strand 31 and recess 431 arranged in body 41, as is illustrated in the example of FIGS. 3a to 3c. Alternatively, the sealing can be assured by using a silicon adhesive material arranged in through orifice 415 after connection means 6 have been mounted.

In FIGS. 3a to 3c, the device assuring the fastening of wristband 3 is formed of a clasp 7 including a buckle 71 and a tongue 72 co-operating with orifices arranged in second wristband strand 32. In this example, clasp 7 is further advantageously hinged to body 41 of casing 4 by means of a pin 403.

In this example, clasp 7 is further advantageously associated with casing 4 so that buckle 71 exerts pressure on movable element 42 through second wristband strand 32 and thus assures that movable element 42 is not opened inadvertently. In this embodiment, buckle 71 of clasp 7 thus assures not only the fastening of wristband 3 but also that SIM card 10 is adequately held in its casing 4.

In order to insert or remove SIM card 10 from casing 4, once wristband strand 32 has been withdrawn, buckle 71 of clasp 7 can easily pivot into a position (shown in dot and dash lines in FIG. 3b) allowing the movement of movable element 42.

Figure 4A:
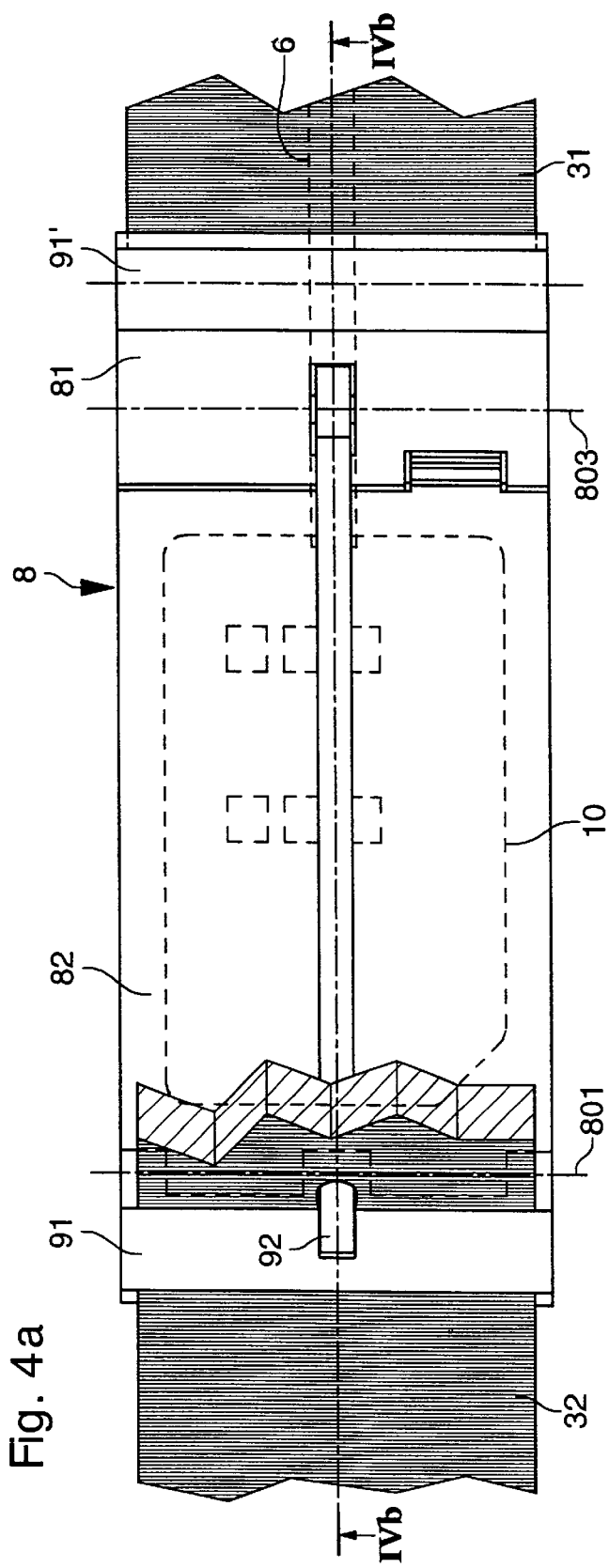

FIGS. 4a and 4b show detailed views of another embodiment of the present invention. This embodiment includes a casing 8 including a body 81 in which SIM card 10 can be housed, and a movable element 82 assuring the closing of casing 8.

Movable element 82 is formed, in this example, of a cover rotatably mounted on body 81 by one of its ends by means of a pin 801. The fastening of this movable element 82 is assured by a snap fitting system 8A similar to the system used in the preceding embodiment.

According to this other embodiment of the present invention, a device 9 assuring the fastening of wristband 3 is formed of a tongue 92 hinged to body 81 by means of a pin 803 and substantially covering movable element 82 lengthways. First and second loops 91 and 91' integral with body 81 of casing 8 are further preferably arranged at each end of casing 8 so as to allow the passage of second wristband strand 32.

It will be noted that, according to this embodiment, tongue 92 is arranged so as to exert pressure directly onto movable element 82 when the watch is worn on the wrist, so as to prevent any inadvertent opening of movable element 82.

According to this second embodiment, in order to insert or remove SIM card 10 from casing 8, once wristband strand 32 has been removed, tongue 92 can easily pivot into a position (shown in dot and dash lines in FIG. 4b) allowing the movement of movable element 82.

Figure 5:
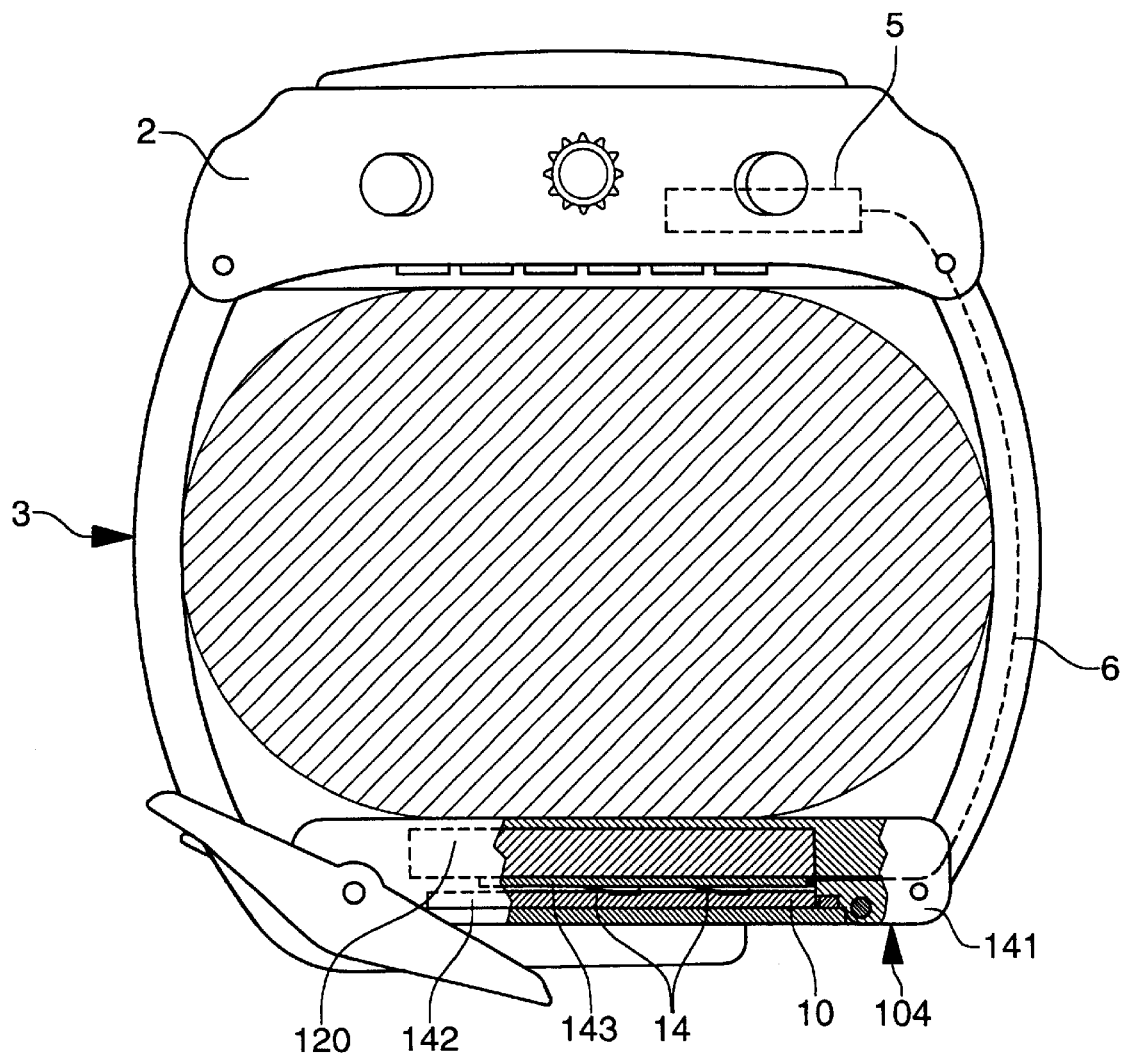
FIG. 5 is an illustration of an embodiment of the present invention wherein a supply source is further arranged in the casing able to receive the SIM card.

Finally, it will be mentioned that according to yet another embodiment of the present invention, illustrated schematically in FIG. 5, that a power supply source (battery, rechargeable accumulator, etc.) for the radio telephone can advantageously be arranged in the casing housing the SIM card.

It will be noted that SIM card includes, as has already been mentioned, six terminals (terminals 14 in FIG. 1) connected internally to an electronic chip, two of these terminals being commonly used to assure the power supply of the electronic chip. A power supply for the radio telephone watch can thus advantageously be associated with the SIM card and the electric connection means, and thus be integrated in the casing of the radio telephone watch according to the present invention.

FIG. 5 thus illustrates schematically an alternative embodiment of a radio telephone watch according to the present invention including case 2, wristband 3, electronic module 5, electric connection means 6 and a casing 104 able to receive SIM card 10. This casing 104 includes, in a similar manner to the previously described embodiments, a body 141 and a movable element 142 assuring the closing of casing 104. According to this embodiment, body 141 is further arranged to receive a power supply 120 for the radio telephone watch.

This power supply 120 is thus disposed in a housing arranged in body 141. Preferably, as is illustrated in FIG. 5, power supply 120 is associated with a printed circuit 143 assuring an electric connection between terminals 14 of SIM card 10 and electric connection means 6. According to this embodiment, printed circuit 143 thus assures in parallel a connection to power supply 120.

This embodiment allows the space requirement and dimensions of the case of the radio telephone watch to be substantially reduced since the power supply typically constitutes a relatively voluminous element. The transfer thereof to the casing housing the SIM card further allows the radio telephone watch to be better balanced around the user's wrist.

What is claimed is:

1. A radio telephone watch intended to be used in a mobile communication system, said watch including a case and a wristband allowing said watch to be worn on the wrist,
   wherein the watch further includes:
   a casing associated with a first strand of said wristband and capable of receiving, in a removable manner, a SIM card (Subscriber Identity Module) allowing access to said mobile communication system;
   an electronic module arranged in said watch case and allowing access to data stored in said SIM card; and
   electric connection means between said SIM card and said electronic module, integrated in said first strand of the wristband.

2. A radio telephone watch according to claim 1, wherein said casing is further associated with said first strand of the wristband so as to be situated in a substantially plane zone of the wrist when the watch is worn.

3. A radio telephone watch according to claim 1, wherein said casing includes:
- a body in which said SIM card is able to be housed,
- a movable element assuring closing of said casing,
- a printed circuit housed in said body and including contact strips intended to come into contact with terminals of the SIM card,
- a connector assuring a connection between said printed circuit and said electric connection means penetrating said body.

4. A radio telephone watch according to claim 3, wherein said casing further includes a sealing gasket disposed in a channel arranged in said body so as to assure sealing of said casing.

5. A radio telephone watch according to claim 1, wherein a device assuring the fastening of said wristband is further associated with said casing.

6. A radio telephone watch according to claim 5, wherein said device assuring the fastening of the wristband also co-operates with said casing in order to prevent said casing from being opened inadvertently.

7. A radio telephone watch according to claim 6, wherein said device assuring the fastening of the wristband includes a buckle and a tongue hinged to said casing and arranged so that said buckle exerts pressure on said casing thereby holding said SIM card in said casing when it is inserted therein.

8. A radio telephone watch according to claim 6, wherein said device assuring the fastening of the wristband includes first and second loops arranged at each end of said casing and a tongue hinged to said casing, this tongue being arranged so that it exerts pressure on said casing thereby holding said SIM card in said casing when it is inserted therein.

9. A radio telephone watch according to claim 1, wherein said electric connection means include conductive paths formed by photolithography on a flexible dielectric substrate.

10. A radio telephone watch according to claim 1, wherein a power supply source is disposed in said casing.

11. A radio telephone watch according to claim 10, wherein a printed circuit housed in said casing and assuring an electric connection between terminals of the SIM card and said electric connection means also assures a connection with said power supply source.

* * * * *